Sept. 27, 1960 C. R. AUSTIN 2,954,244
MOVABLE GAS SEALING DEVICE FOR FURNACES AND THE LIKE
Filed Aug. 10, 1956
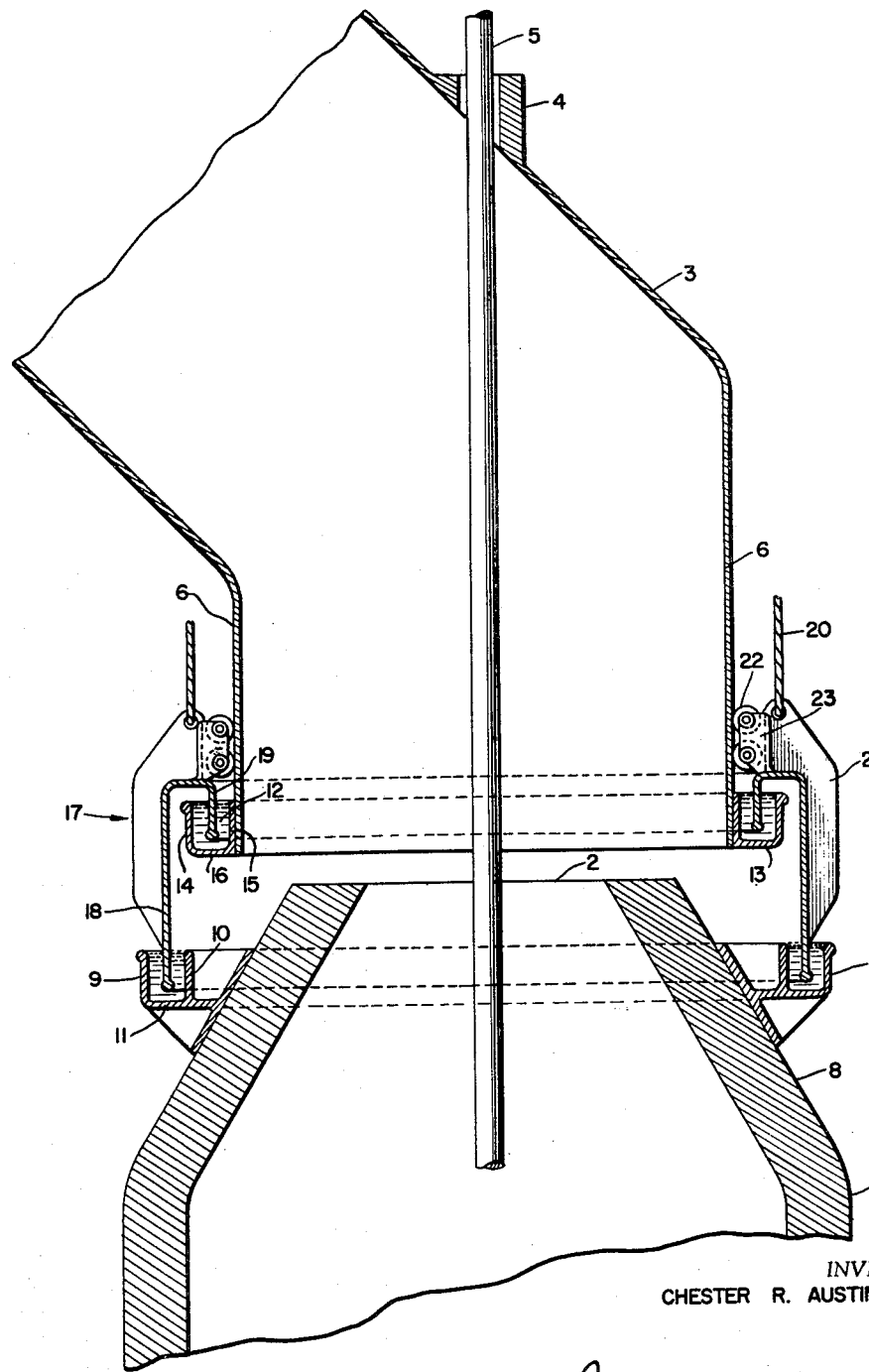
INVENTOR
CHESTER R. AUSTIN
BY *James E. Toomey*
ATTORNEY

United States Patent Office 2,954,244
Patented Sept. 27, 1960

2,954,244

MOVABLE GAS SEALING DEVICE FOR FURNACES AND THE LIKE

Chester R. Austin, Martinez, Calif., assignor to Henry J. Kaiser Company, Oakland, Calif., a corporation of Nevada Filed Aug. 10, 1956, Ser. No. 603,429

6 Claims. (Cl. 285—11)

For present invention relates to a sealing device for utilization in conjunction with gas collection systems, and in particular to a movable sealing device in a closed system for collection of gases evolved in chemical and metallurgical processes from apertures in furnaces and other apparatus in which gas-producing reactions are conducted.

More specifically, the invention relates to a movable sealing device and the combination thereof with a gas collecting means utilized in the refining of impure metal, such as molten pig iron, by surface blowing with oxygen in an open-mouthed converter.

As is well known, in certain metallurgical and chemical processes, the reactions occurring cause evolution of gases or fumes with or without entrained solid particles, and the gases are of such nature with respect to atmospheric polution or heat recovery value that closed systems for their collection are not only desirable but necessary. In many such operations, it is not feasible from practical operating considerations to provide a closed system in which all of the elements or pieces of apparatus may remain in fixed position. Relative movement of the furnace or reaction vessel, or of the gas collecting hoods or ducts, or both, may be necessary, for example, in charging and discharging of the furnace or the reaction vessel. Accordingly, closed gas collection systems must be provided with spaces intervening the aperture or mouth of the furnace and the gas collecting duct or hood. In such case, it becomes of extreme importance to provide a sealing device, which will prevent the escape of the effluent gases, and in certain instances to prevent aspiration of air into such gases.

The provision of an improved movable sealing device to accomplish this result, and also to permit relative movement of the furnace and/or the gas collection means, is the primary object and purpose of the present invention.

It is another object to provide a movable gas sealing device which is simple in structure and operation, and which facilitates movement thereof into and out of sealing engagement.

It is a further object of the invention to provide a sealing device in closed systems for gas collection from reaction vessels which will permit movement into and out of sealing engagement in such a manner, that operation of associated equipment, such as the reaction vessel, the gas collection means, the charging and discharging chutes and ladles may be accomplished with a minimum of interference and consumption of time.

A more specific object of the invention is to provide a movable sealing device, which in operative position provides a gas tight seal between an open-mouthed converter and a spaced gas collecting duct, which by simple linear retractive movement of the sealing device will permit tilting of the converter for charging and discharging.

Other objects and advantages of the invention will be apparent from the following more detailed description of the invention. The sealing device is specifically described in conjunction with a closed system for collection of effluent gases from an open-mouthed tilting converter utilized in the refining of molten ferrous metal by surface blowing with oxygen as set forth in detail in Patents Nos. 2,741,554 and 2,741,555. This constitutes one of the most advantageous applications of the invention. It is to be understood, however, that the invention is by no means limited thereto, since it is fully applicable, as above set forth, to any type of closed gas collection system for metallurgical furnaces or chemical reaction vessels in which relative movement of the collection duct and the furnace is desired. For example, the device of the invention finds advantageous application in closed gas collection systems utilized in conjunction with the refining of cupreous and other non-ferrous metals in open-mouth or trough type furnaces.

In the so-called oxygen steel refining process, an open-mouthed converter of conventional symmetrical or unsymmetrical pear shape having a closed bottom rather than tuyeres is utilized. A gas supplying lance is inserted through the open mouth of the converter to supply the oxygen or oxygen-enriched air which is utilized as the primary refining means to develop the heat necessary for refining by oxidation of the impurities in the molten metal under treatment. In such process, the gases formed by the oxidizing reactions are composed primarily of carbon monoxide and carbon dioxide in variable proportion depending upon reaction conditions. It is a characteristic of the oxygen refining process, however, that a fume or dust is contained in the exit gases in the form of finely divided solid particulate matter. Collection of such gases is very desirable from the standpoint of avoiding atmospheric pollution and also in order to enable the recovery of the heat value in the gases. At the same time, it is necessary that any closed system permit the converter to be rotated on the conventional trunnion mounting for charging and for pouring after refining is completed.

The device of the instant invention provides a gas confining means or a gas exhaust hood in spaced relation to the open mouth of the converter in vertical operating position, and a sealing device which is movable into and out of sealing engagement to close the space intervening the exhaust gas hood and the converter mouth.

Broadly, the sealing device comprises in combination with the reaction vessel and the gas-confining means, that is, the hood or duct, means on said gas-confining means adapted to carry a fluid sealing medium, preferably a second sealing medium carrying means on said vessel, and a movable sealing member encompassing the space between the gas confining means and the vessel, the sealing member including depending terminal portions which engage respectively in the sealing media of the containing means on the gas confining means and the vessel.

The invention is further described with reference to the accompanying drawing which is a sectional view of the sealing device of the invention in sealing position with the associated converter and gas collecting hood also in section. This complete specific embodiment is merely illustrative of a preferred form, and is not intended to limit the scope of the invention defined by the appended claims.

Referring to the figure of the drawings, the upper portion of a closed bottom converter 1 as commonly used in top blowing in steel refining is shown, and the converter is rotatably supported by conventional trunnions (not shown). Located above the open mouth 2 of the converter in vertical position is exhaust gas hood 3 through the apertured fitting 4 of which the gas supplying lance or pipe 5 is inserted in vertical position. The vertical sides 6 of cylindrical exhaust hood 3 preferably extend laterally beyond the transverse limits of the mouth 2 of converter 1.

An annular channel member 7 encompasses upper conical portion of the converter 1 and is attached to and carried by the sloping side walls 8 of the upper portion of the converter. The side walls 9 and 10 and bottom 11 of channel member 7 together form a trough adapted to carry a suitable gas sealing medium 12. The sealing medium is a fluid which may be a liquid, such as water or molten metal, or a solid, such as sand.

A similar annular channel member 13 is carried by the gas exhaust hood 3, around the outer periphery of the lower edge of vertical sides 6 adjacent the converter mouth. The side walls 14 and 15 and bottom 16 of the annular member 13 form a trough carrying a gas sealing medium as in the case of member 7.

A movable gas sealing member 17 in sealing position is interposed between the exhaust hood 3 and the converter mouth 2 to provide a gas tight closure preventing aspiration of air into the space intervening the converter mouth and the hood, and for collecting the effluent gases in undiluted form. The sealing device 17 comprises an inverted annular channel member, the outer side wall 18 of which extends downwardly or depends below the lower edge of the inner sidewall 19 thereof, so that when the sealing device is in sealing position, the side walls 18 and 19 engage the sealing media in the annular members 7 and 13, respectively.

The sealing member 17 is suspended for movement in a substantially vertical direction by cables 20 attached to ribs 21 carried on the outer side of member 17, the suspension from the cables being effected by any suitable means such as pulleys and counterweights (not shown).

A further feature of the invention provides guide wheels 22 carried by brackets 23 attached to the rib sections 21 of the sealing member, the guide wheels being mounted in rolling engagement with the outer periphery of the exhaust hood 3. In this manner, upon vertical movement of the sealing device into and out of sealing position, any swinging motion or other non-vertical movement is substantially completely avoided.

In operation the converter is rotated to non-vertical position, while the sealing member 17 is raised to permit clearing of the wall 18 of the sealing member with respect to the annular trough member 7 mounted on the converter. The converter is charged with the hot metal, such as molten pig iron, scrap, and any other additions, such as slag forming agents, and is then returned to vertical position. The lance 5, which is movable, is then inserted into the converter mouth preferably with the gas supply started and is adjusted to the proper position for blowing the charge. The sealing member 17 is lowered into sealing position so that the outer wall 18 engages the sealing medium 12 in the annular channle 7 and the inner depending wall 19 engages the sealing medium in the annular trough 13. The gases and any solids, such as the dust or fumes above-mentioned, then pass directly out of the converter mouth into the exhaust hood 3 to suitable collecting and/or separating or heat recovery systems. The sealing device of the invention, thus provides a gas tight connection between the converter and the exhaust hood, which prevents any aspiration of air into the space intervening the converter mouth and the hood. This permits the collection, and subsequent treatment of the effluent gases in undiluted form, which advantageously reduces the capacity of the collecting and treating systems due to the smaller volume of gases.

It will be understood that various modifications may be made to the device of the invention without departing from the spirit of the invention, the scope of which is limited only by the appended claims. For example, the annular channels 7 and 13 may be differently located on the converter and the exhaust hood, respectively, and of any suitable sealing medium-retaining shape. Channel 13 may be positioned above the lower end of exhaust hood 3, particularly when exhaust hood 3 has an extended vertically disposed portion. Also member 7 may be positioned closer to the mouth of the converter on the side walls, or at a greater distance from the mouth, with corresponding reduction or extension of the length of outer wall 18 of the sealing member.

Although the configuration of the sealing member, as shown and described is annular, it is apparent that it may be of any suitable shape such as square, rectangular or other polygonal shape in horizontal cross-section, depending upon the shape of the particular furnace and exhaust hood with which it is utilized. Also, although only two sets of guide wheels for the sealing member are shown, larger numbers of guide wheels may be utilized in the event it is desired to impart a greater stability in the vertical movement of the sealing device.

It is also contemplated, although not a part of the preferred form of the invention, to position the annular member 13 on the inside periphery of the exhaust hood 3, in which case the longer sidewall of the sealing member would be the inner wall extending down into engagement with the sealing medium contained in the trough attached to the converter. The sealing member would then be raised and lowered inside of the exhaust hood. Still another alternative would be to provide an exhaust hood of enlarged transverse dimension so that the annular trough 13 laterally extends beyond the trough 7 on the converter, in which case the elongated side wall 18 for sealing engagement with trough 7 would become the inner wall of the sealing device with the outer wall being the shorter end engaging the sealing medium in trough 13.

It should also be noted that where a totally gas tight seal is not required, the annular trough, or other liquid sealing medium container, supported by the converter wall adjacent the aperture may be dispensed with, and the depending terminal portion of the sealing member may be permitted to close the space merely by peripheral engagement with the walls of the converter.

It may be seen that the invention provides a device of relatively uncomplicated structure and function, capable of easy movement into and out of sealing engagement between the hood and the converter or other furnace, and is particularly advantageous in permitting freedom of rotation of the converter on its trunnions merely by raising the movable sealing member to a height sufficient to clear the arcuate path of the upper portion of the converter. Upon tilting of the converter to non-vertical or even horizontal position, it is apparent that a liquid sealing medium would flow out of the trough 7. Where water is utilized, this spilling is simply compensated by refilling the trough with water, or where other more valuable sealing media are employed, any suitable means for draining or siphoning of the sealing medium prior to tilting of the converter may be adopted.

What I claim is:

1. The combination of an apertured vessel wherein gases are generated, gas confining means spaced above said vessel aperture adapted to receive the effluent gases, fluid sealing medium-containing means peripherally positioned on said gas confining means, and a movable annular sealing member encompassing the space between said gas confining means and said vessel and having a terminal portion adapted to engage said fluid sealing medium and another terminal portion adapted to peripherally engage the wall of said vessel, said sealing member being suspended for easy movement into and out of sealing position.

2. The combination as set forth in claim 1 in which the apertured vessel is also provided with fluid sealing medium-containing means around the periphery thereof, and said other terminal portion of said sealing member is adapted to engage the fluid sealing medium therein.

3. The combination of an apertured reaction vessel wherein gases are generated, a gas confining means spaced above the aperture of said vessel adapted to receive the effluent gases, an annular fluid sealing medium-containing trough positioned around the outer periphery of said gas confining means at the lower portion thereof, another fluid sealing medium-containing trough disposed about the periphery of the vessel adjacent the aperture thereof, and a movable annular gas sealing member encompassing the space between said gas confining means and said vessel having terminal portions adapted to engage respectively in the fluid sealing media in said troughs, said movable sealing member being suspended for easy movement in a substantially vertical direction into and out of sealing engagement with said sealing medium.

4. A combination as set forth in claim 3 wherein said movable sealing member is provided with guide means in contacting relationship with the periphery of said gas confining means.

5. A gas sealing device in a closed gas collection system provided with an effluent gas take-off duct above and in spaced relation to the open mouth of a rotatable converter in which gases are generated, said sealing device comprising fluid sealing material containing means engaging the periphery of the gas duct at the lower portion adjacent the converter mouth, a second fluid sealing medium-containing means positioned on the converter wall adjacent the mouth, and a vertically movable annular sealing member comprising an inverted channel having an outer depending portion adapted to engage the fluid sealing medium in the containing means on said converter, and an inner depending terminal portion adapted to engage the fluid sealing medium in the containing means on said gas duct, said sealing member being suspended for easy movement in a substantially vertical direction into and out of sealing engagement with the sealing medium in the containing means on said gas duct and said converter.

6. A sealing device according to claim 5 in which said sealing member is provided with wheeled guide means in rolling engagement with the outer walls of said gas duct for guiding the vertical movement thereof.

References Cited in the file of this patent

UNITED STATES PATENTS

| | | |
|---|---|---|
| 751,976 | Craig | Feb. 9, 1904 |
| 1,078,727 | Geiger | Nov. 18, 1913 |
| 1,244,722 | Finne | Oct. 30, 1917 |
| 1,824,422 | Badger | Sept. 22, 1931 |
| 1,930,756 | Heath et al. | Oct. 17, 1933 |
| 2,429,481 | Mohr | Oct. 21, 1947 |
| 2,516,743 | Allin | July 25, 1950 |
| 2,737,685 | Filter | Mar. 13, 1956 |

FOREIGN PATENTS

| | | |
|---|---|---|
| 325,212 | Italy | Mar. 5, 1935 |
| 638,078 | Great Britain | May 31, 1950 |
| 1,116,195 | France | Jan. 30, 1956 |